United States Patent [19]

Ono

[11] 3,849,798

[45] Nov. 19, 1974

[54] CARTRIDGE ADAPTER

[75] Inventor: Yoshio Ono, Tokyo, Japan

[73] Assignee: Pioneer Electronic Corporation, Tokyo, Japan

[22] Filed: Oct. 6, 1972

[21] Appl. No.: 295,644

[30] Foreign Application Priority Data

Oct. 8, 1971 Japan .............................. 46-92732

[52] U.S. Cl. .................................. 360/94, 226/194
[51] Int. Cl. ........................................ G11b 31/00
[58] Field of Search .............. 226/194; 74/206, 207; 274/4 R, 4 B, 4 G, 4 D, 11 R, 11 D, 11 B

[56] References Cited

UNITED STATES PATENTS 3,269,626 8/1966 Albrecht ............................ 226/194
3,662,123 5/1972 Huber ................................ 274/4 G
3,708,135 1/1973 Lace ................................. 274/4 B

*Primary Examiner*—Harry N. Haroian
*Attorney, Agent, or Firm*—Sughrue, Rothwell, Mion, Zinn & Macpeak

[57] ABSTRACT

In a cartridge adapter in which torque is transmitted from the capstan of the tape recorder to the tape in the small-sized tape cartridge by means of an idler and a driving idler, the idler and the driving idler may be mounted on flexible shafts positioned so that they are forced into firm contact with each other by the pressure of the tape recorder capstan against the idler when the adapter is in use, but are not touching or are just barely in contact when the adapter is in use, thereby avoiding the risk that they will produce permanent deformation to each other when the adapter is not in use.

5 Claims, 6 Drawing Figures

CARTRIDGE ADAPTER

BACKGROUND OF THE INVENTION

Tape cartridges of various sizes are in use today. One particularly popular style, known as the Lear-jet type, is 6.35 mm (¼ inch) in width, while another, known as a small-sized endless-tape cartridge, is 3.81 mm (⅛ inch) in width. The diameter of the wound tape in the Lear-jet type cartridge is also correspondingly greater than the diameter of the wound tape in the small-sized endless tape cartridge.

It has been known heretofore that small-sized tape cartridges may be used in tape recorders developed for larger tape cartridges if the small-sized tape cartridge is first inserted in a cartridge adapter having the same external dimensions as the tape cartridge for which the tape recorder was designed. However, problems have been encountered in transmitting torque from the capstan of the tape recorder to the tape in the small-sized cartridge. Both belts and driving idlers have been used for this purpose, but neither has proved entirely satisfactory. Extreme dimensional precision is required to transmit the torque by means of a belt, and the transmission has a tendency to be unstable, resulting in a "wow" or "flutter" in the sound. On the other hand, when the torque is transmitted by means of an idler abutted to the capstan of the tape recorder and a driving idler abutted thereto and to a pinch roller in the adapter, the transmission is stable, but the force with which the idler and the driving idler must be abutted in order to transmit the torque is also sufficient to risk deforming the idler when the adapter is not used for a long time. The adapter may, of course, be designed so that the idler may be brought into engagement with the driving idler when the adapter is in use and out of engagement when it is not. However, the mechanism to accomplish this result adds complication to the adapter, and difficulties have been encountered in maintaining the requisite precision in manufacturing them.

The present invention is designed to overcome the above-mentioned drawbacks. Accordingly, an object of the invention is to provide a cartridge adapter in which an extremely simple mechanism ensures that the idler and the driving idler will not be deformed when they are not used. Another object of the invention is to provide a cartridge adapter which employs torque from the capstan in the tape recorder to move the magnetic tape in the small-sized tape cartridge accurately. Still another object of the invention is to provide a cartridge adapter which is easy to manufacture and cheap in price.

BRIEF DESCRIPTION OF THE INVENTION

In a cartridge adapter in which torque is transmitted from the capstan of the tape recorder to the tape in the small-sized tape cartridge by means of an idler and a driving idler, the idler and the driving idler are mounted on flexible shafts positioned so that they are forced into firm contact with each other by the pressure of the tape recorder capstan against the idler when the adapter is in use, but are not touching or are just barely in contact when the adapter is not in use, thereby avoiding the risk that they will produce permanent deformation in each other when the adapter is not in use. When one face of the adapter is made from a synthetic resin, the shafts may be molded externally with that face. The other end of the shafts need not be attached to the other face of the adapter, but may fit loosely into bearings thereon or may be entirely free.

DETAILED DESCRIPTION OF A PREFERRED EMBODIMENT OF THE INVENTION

Figure 4:
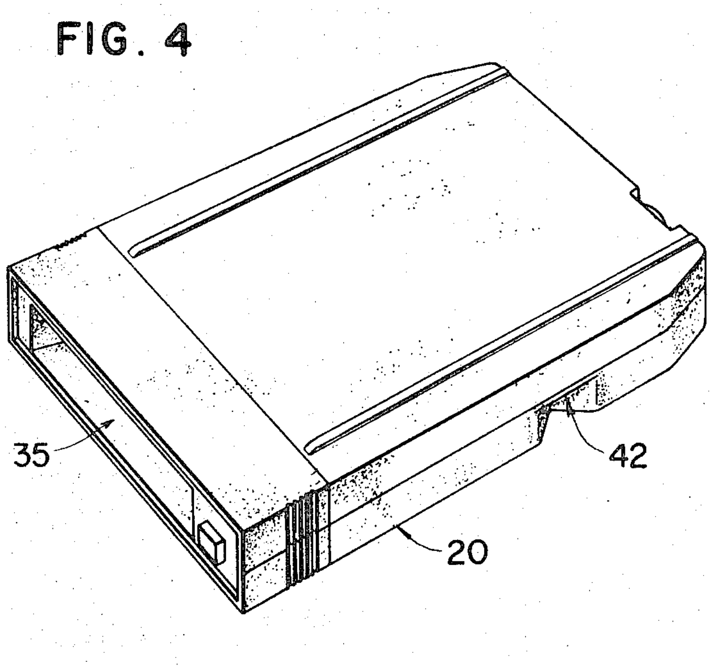
FIG. 4 is a perspective view of a cartridge adapter of a type in which the present invention may be employed.
Figure 5:
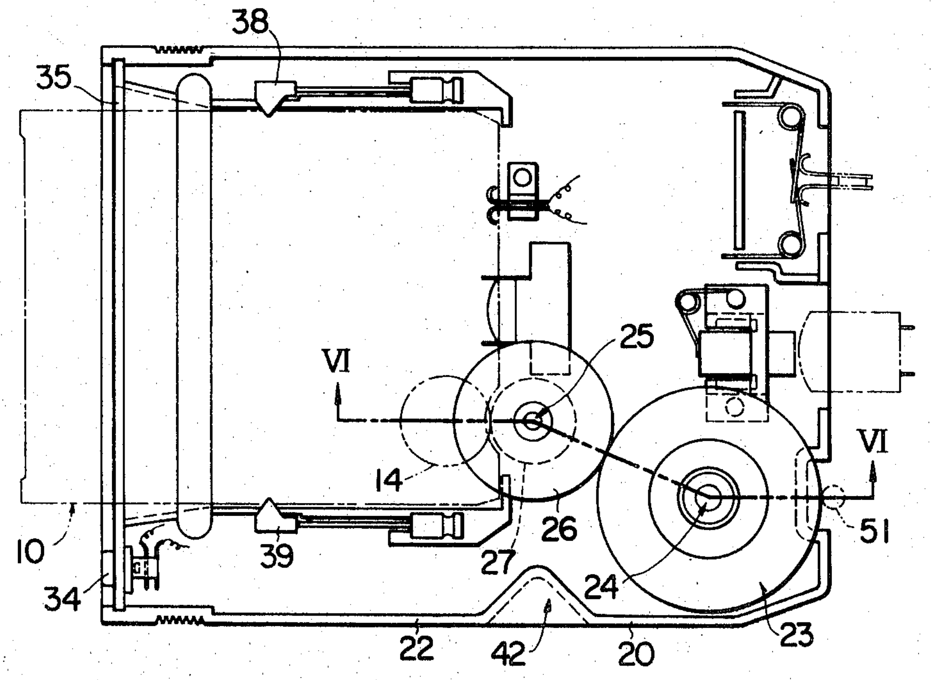
FIG. 5 is a plan view of the cartridge adapter depicted in FIG. 4 with its upper cover removed.
Figure 6:
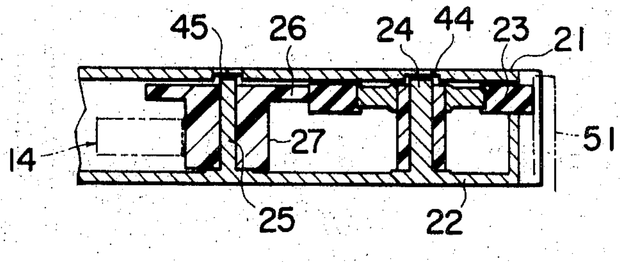
FIG. 6 is a sectional view taken along line VI — VI in FIG. 5.

The preferred embodiment of the present invention, depicted in FIGS. 4–6, may be understood more easily after a conventional Lear-jet type endless-tape cartridge and a conventional small-sized endless-tape cartridge have first been described.

Figure 1:
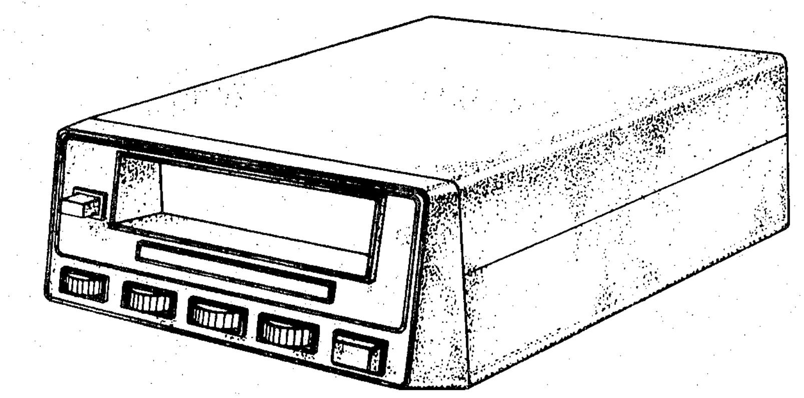
FIG. 1 is a perspective view of a stereo tape recorder of a type in which cartridge adapters made in accordance with the present invention could be used.
Figure 2:
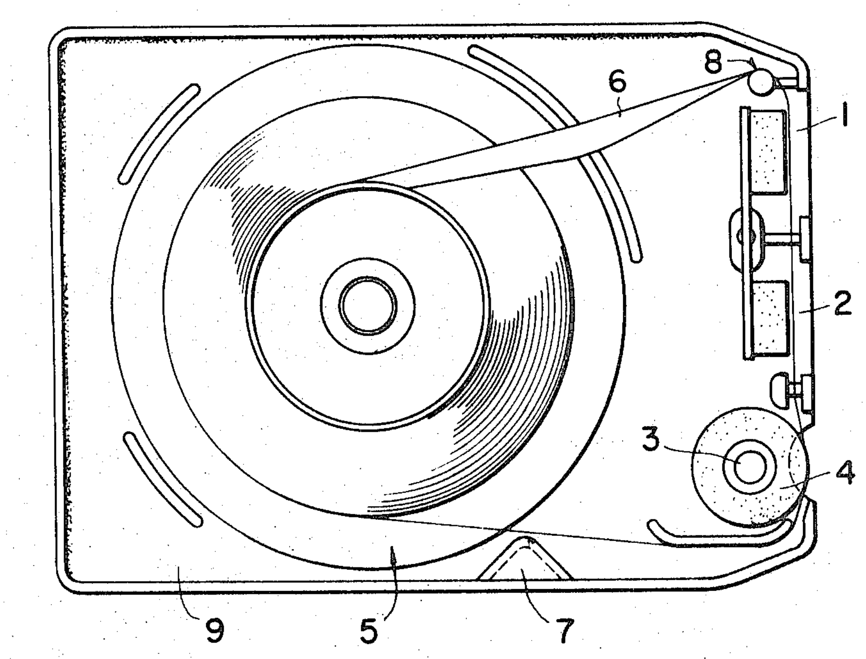
FIG. 2 is a plan view of a Lear-jet type endless tape cartridge with its upper cover removed.

In FIG. 2, which depicts a conventional Lear-jet type endless tape cartridge, the numeral 9 designates the cartridge generally. Internally an endless magnetic tape 6 is wound around a reel 5, a pinch roller 4 mounted on a fixed shaft 3, and a guide 8. Between the pinch roller 4 and the guide 8, the tape passes through slits 1 and 2, provided to allow penetration of the detecting terminal and magnetic head mounted on the tape recorder. V-shaped notch 7 is provided to cooperate with means located within the tape recorder for bringing the pinch roller 4 into firm engagement with the capstan of the tape recorder (not shown in FIG. 2; 51 in FIG. 5). In use, the tape 6 passes between the pinch roller 4 and the capstan of the tape recorder, and torque from the capstan is transmitted to the tape.

Figure 3:
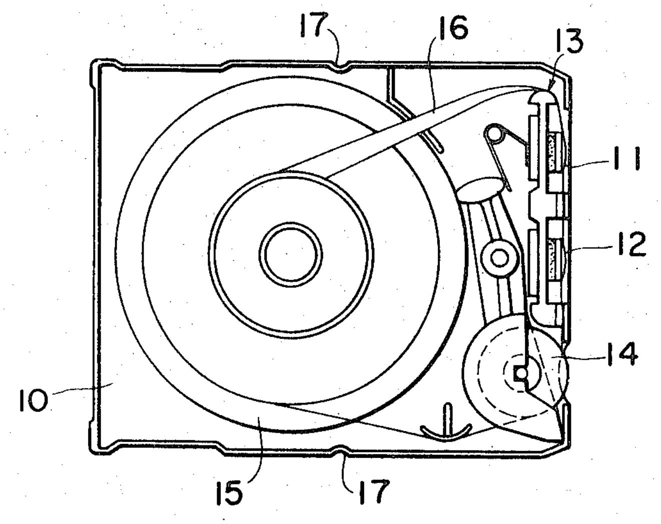
FIG. 3 is a plan view of a small-sized endless tape cartridge with its upper cover removed.

In FIG. 3, which depicts a conventional small-sized endless tape cartridge, the numeral 10 designates the cartridge generally. In many respects, it is quite similar to the cartridge depicted in FIG. 2. An endless magnetic tape 16 is wound around a reel 15, a pinch roller 14, and a guide 13. Between the pinch roller 14 and the guide 13, the tape passes through slits 11 and 12, which serve the same function as slits 1 and 2 in the cartridge depicted in FIG. 2. Notches 17 are provided on both walls of the cartridge to hold the cartridge inside a tape recorder or a cartridge adapter, as the case may be.

In FIGS. 4 through 6, the numeral 20 designates the body of the cartridge adapter, which is comprised of a cover 21, a box 22, and shafts 24 and 25. The numeral 42 designates a V-shaped notch on the sidewall of the adapter which corresponds to the V-shaped notch 7 on the sidewall of the large-sized tape cartridge 9 in FIG. 2, and the numeral 35 denotes an insertion hole for a small-sized cartridge such as that depicted in FIG. 3. The numeral 38 designates pawls which engage with the holding notches 17 to hold the cartridge firmly in the adapter and the pinch roller 14 firmly against the capstan portion 27 of the driving idler 26. The box and the resilient shafts are made of a flexible synthetic resin, and they are molded integrally. An idler 23 and a driving idler 26 having a capstan portion 27 are mounted on the shafts 24 and 25, respectively, and the shafts are positioned so that, when the adapter is not in use, the idler and the driving idler are very close to each other or just barely in contact. Their positioning is far enough apart so that the idler and the driving idler will not deform each other when the adapter is not in use, but close enough together so that the pressure of the capstan 51 of the tape recorder against the idler will cause it to press against the driving idler with sufficient force to permit torque from the tape recorder capstan to be transmitted through the idler to the driving idler, which in turn, in cooperation with the pinch roller 14 in the small-sized cartridge, causes the movement of the tape. It has been found that a deformation of less than 1 mm is adequate to transmit the rotation stably, and the bearings 44, 45 are provided in the upper cover to prevent unnecessary deformation. However, the bearings have diameters enough larger than their respective shafts so that the bearings do not interfere with the necessary deformation.

While the invention has been particularly shown and described with reference to a preferred embodiment thereof, it will be understood by those skilled in the art that various changes in form and detail may be made therein without departing from the spirit and scope of the invention.

What is claimed is:

1. In a cartridge adapter having external dimensions and configuration of a large-size cartridge and mounting internally a small-size tape cartridge, and further having a pair of side by side idlers for transmitting by peripheral, frictional contact, torque from the capstan external of the cartridge adapter to the tape within the small-sized tape cartridge, the improvement wherein:

at least said idler contacting said capstan is mounted on a resilient, flexible shaft and said idlers are positioned relative to each other such that when the adapter is in use, said capstan presses on said adjacent idler to flex its shaft and to move that idler into firm contact with said tape contacting said idler, and when said adapter is not in use and contact with said capstan ceases, there is no more than bare contact between said idlers, and said flexible shaft and one face of the adapter are molded integrally.

2. The cartridge adapter of claim 1, wherein said flexible shaft fits loosely into a bearing on the opposite face of the adapter.

3. In a cartridge adapter having external dimensions and configuration of a large-size cartridge and mounting internally a small-size tape cartridge, and further having a pair of side by side idlers for transmitting by peripheral, frictional contact, torque from the capstan external of the cartridge adapter to the tape within the small-size tape cartridge, the improvement wherein:

both idlers are mounted on resilient, flexible shafts, and said idlers are positioned relative to each other such that when the adapter is in use, said capstan presses on said adjacent idler to flex its shaft and to move that idler into firm contact with said tape contacting idler, but when the adapter is not in use and contact with said capstan ceases, there is no more than bare contact between said idlers.

4. The cartridge adapter of claim 3, wherein both said shafts and one face of the adapter are molded integrally.

5. The cartridge adapter of claim 4, wherein both said shafts fit loosely into respective bearings on the opposite face of the adapter.

* * * * *